United States Patent [19]
Winegar

[11] Patent Number: 5,918,555
[45] Date of Patent: Jul. 6, 1999

[54] CATALYTIC METHOD FOR $NO_X$ REDUCTION

[76] Inventor: Phillip Winegar, 11 Riverside Dr., New York, N.Y. 10023

[21] Appl. No.: 08/977,590

[22] Filed: Nov. 25, 1997

Related U.S. Application Data

[62] Division of application No. 08/634,775, Apr. 19, 1996, Pat. No. 5,738,024.

[51] Int. Cl.⁶ .................................................... B01D 50/00
[52] U.S. Cl. ........................... 110/345; 422/171; 422/172
[58] Field of Search ...................................... 110/345, 347; 502/239; 423/239; 422/171, 172, 173, 174, 175

[56] References Cited

U.S. PATENT DOCUMENTS

| | | | |
|---|---|---|---|
| 5,233,934 | 8/1993 | Krigmont et al. | 110/345 |
| 5,237,939 | 8/1993 | Spokoyny et al. | 110/345 |
| 5,582,802 | 12/1996 | Sspokoyny et al. | 422/173 |
| 5,603,909 | 2/1997 | Varner et al. | 422/173 |
| 5,616,499 | 4/1997 | Lewis et al. | 110/347 |
| 5,618,499 | 4/1997 | Lewis et al. | 110/347 |
| 5,738,024 | 4/1998 | Winegar | 110/345 |

Primary Examiner—Teresa Walberg
Assistant Examiner—Gregory A. Wilson
Attorney, Agent, or Firm—Nims Howes Collison Hansen & Lackert

[57] ABSTRACT

An apparatus and method for reducing $NO_x$ pollution in flue gas produced by a power plant uses heat exchanger elements having extended surfaces which contain a SCR catalyst, with the heat exchanger elements located in the flue gas stream. Coolant is passed through the heat exchanger elements to cool the catalyst, with a temperature control system used to maintain the catalyst at its optimum temperature such that the maximum conversion of $NO_x$ is achieved. Utilizing the present invention, temperature cycling of the catalyst is avoided, prolonging the life of the catalyst, while at the same time optimizing the efficiency of conversion regardless of variations in the flue gas flow or temperature.

7 Claims, 3 Drawing Sheets

5,918,555

CATALYTIC METHOD FOR NO$_x$ REDUCTION

This is a divisional of U.S. patent application Ser. No. 08/634,775, filed Apr. 19, 1996, now U.S. Pat. No. 5,738,024.

TECHNICAL FIELD

This invention relates to power plant emissions, and more particularly to an apparatus for reducing NO$_x$ in a flue gas stream through contact with a catalyst maintained at a constant temperature.

BACKGROUND

In a fossil fuel power plant, coal or natural gas are burned in a combuster. The combustion gas also known as flue gas, heats water to form steam which turns a turbine generator to produce electric power. The flue gas steam is passed through an air preheater such as a rotating wheel heat exchanger, that transfers heat from the flue gas to an incoming air stream that thereafter flows to the combuster.

The flue gas contains the products of combustion, including solid particulates, and gases such as nitrogen and carbon dioxide. In addition, various pollutants gases may be contained in the flue gas stream, most notably, nitrogen oxides, more commonly known as NO$_x$. Such NO$_x$ emissions, must be reduced to the maximum extent possible. To remove NO$_x$, a compound such as ammonia is typically injected into the flue gas stream. The ammonia reacts with the NO$_x$ to form nitrogen and water, reducing the NO$_x$ content of the flue gas. The reaction of ammonia and NO$_x$ may be performed at high temperature without a catalyst, a process known as "selective non-catalytic reduction" (SNCR). It may also be performed at lower temperature in the presence of a catalyst, a process termed "selective catalytic reduction" (SCR).

In U.S. Pat. No. 4,060,273, there is described the use of heat exchanger elements coated with a catalyst. The heat exchanger elements are located in flue gas such that NO$_x$ conversion is accomplished. In the disclosed device, the catalyst is located on the circulating regenerative heat exchanger which rotates between the hot gas stream and the cold gas stream. This is necessary to prevent the catalyst from degrading in the hot gas stream. Consequently, the temperature of the catalyst continually changes as the heat exchanger elements rotate from the hot gas stream to the cold gas stream.

In U.S. Pat. Nos. 5,145,652 and 4,940,567, another apparatus for removing nitrogen from flue gas is discussed which has catalyst disposed on heat exchanger elements. These patents again utilize regenerative type heat exchanger which moves from a hot gas stream to a cold gas stream, such that the catalyst is subject to temperature cycling. As an alternative, occasionally the catalyst is provided in the form of a fixed catalyst bed through which the flue gas must pass. However, due to the physical temperature limitations of the catalyst, use of a stationary catalyst bed requires that the flue gas be cooled, which correspondingly results in a reduction in the activity of the catalyst, with a consequent reduction in the ability to remove NO$_x$ from the flue gas stream. Such fixed beds also increase significantly the capital cost of the system, require periodic extensive shutdowns for catalyst cleansing and add significant pressure drop to the gas flow system. Thus, such systems are not favored in the industry.

Another problem with existing systems, beyond the extreme catalyst cycling is the natural variations in temperature of the flue gas stream. This can vary depending on the incoming gas temperature, power output requirements, type and quantity of fuel, etc. Thus, conversion efficiency, which depends on temperature, can vary on a daily basis.

SUMMARY OF THE INVENTION

It is an object of the present invention to provide a method and apparatus for reducing NO$_x$ in a flue gas stream, without subjecting the catalyst to temperature cycling.

It is another object of the present invention to provide a reduction in NO$_x$ from a flue gas stream without requiring a reduction in flue gas temperature prior to contact with the catalyst so as to maintain the optimum activity of the catalyst in reducing the NO$_x$ emission.

It is another object to provide a system for NO$_x$ reduction which is of relatively low capital cost and which provides for ease in maintenance and quick replacement of spent catalyst elements.

These and other objects of the present invention are achieved by a heat exchanger having extended surfaces which contain a SCR catalyst, the heat exchanger being provided with a cooling medium so as to control the temperature of the catalyst to maintain at its optimum temperature for maximizing conversion of NO$_x$ compounds, for removal from the flue gas stream, and further having control means for controlling the flow of cooling medium for maintaining the catalyst at its optimum temperature. The heat exchanger is located in a hot flue gas stream to provide the optimum temperature for reaction with the SCR catalyst, with the heat exchanger providing direct catalyst cooling for maintaining the integrity of the catalyst while operating at its optimum temperature for reduction of the NO$_x$ compounds. By controlling the temperature of the catalyst, so that it can survive the high flue gas temperatures without degradation, maximum or near maximum conversion of NO$_x$ compounds is achieved, while avoiding temperature cycling which degrades the catalyst, further extending the life of the catalyst in the flue gas stream.

DETAILED DESCRIPTION OF THE INVENTION

Figure 1:
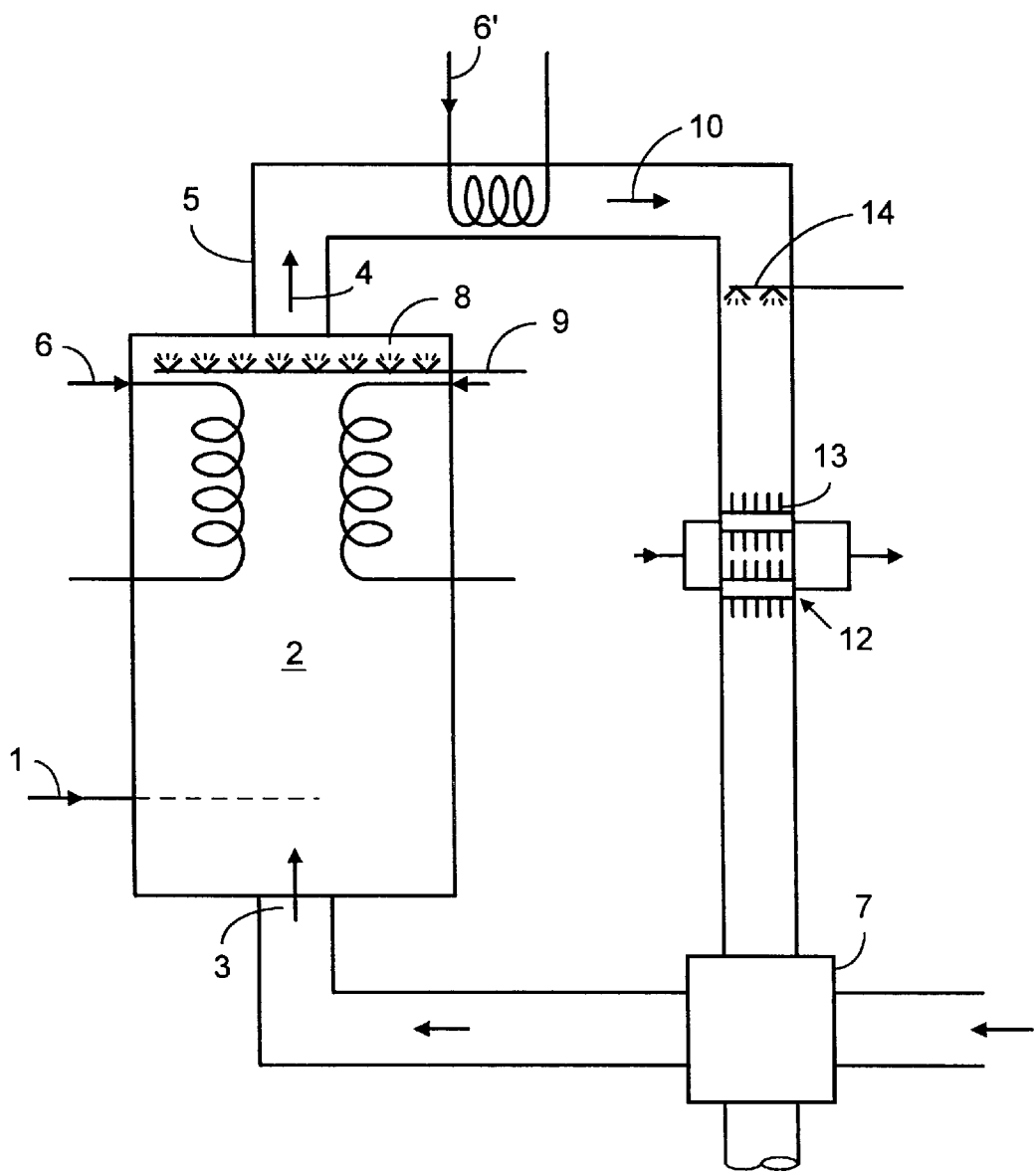
FIG. 1 is a schematic view of a portion of a power plant flue gas flow system in accordance with the present invention.

FIG. 1 depicts a power plant utilizing the present invention. A fuel 1 such as oil, gas or coal is fed into a boiler 2, the fuel mixed with incoming preheated air 3 and burned, producing hot combustion gas known as flue gas 4, which is transported by a duct 5. The flue gas heats water flowing through pipes 6 located within the boiler and optionally downstream in the duct, at 6', to form steam, which may turn a turbine generator (not shown) to produce electricity.

The hot flue gas continues through the conduit 5 to a heat exchanger 7, which may be a rotating wheel type heat exchanger. In such a device, a wheel of the heat exchanger continuously rotates about its axis from the hot flue gas side to the incoming air side. The heat exchanger 7 typically includes a plurality of heat exchange elements which are heated by the passage of the flue gas, with the heat transferred to preheat the incoming air 3. While such a heat exchanger is shown and described as relates to a typical installation, there are instances where no such heat exchanger is used and one can fully utilize the invention in systems which do not use this heat exchanger.

Prior to the heat exchanger 7, and possibly as far back as the boiler outlet end, a reactive gas 8 such as ammonia, amines and/or other additives is injected into the flue gas stream through reactive gas injectors 9. This is the first step in $NO_x$ reduction, the SNCR step.

After the flue gas leaves the boiler, it is treated with a SCR catalyst, either upstream or downstream of the air heater 7, as follows. A flue gas 10 is contacted with a plurality of heat exchange elements 12, each containing surfaces 13 coated with or composed of an SCR catalyst. "Composed of" means that the elements could be made of a catalytic element, such as titanium, which is sufficient to catalyze the reaction.

The catalyst is located on the surfaces of the heat exchange elements such that the elements maintain the catalyst at a predetermined temperature for optimum reaction of the $NO_x$ compounds in the flue gas stream. Upstream of the elements 12, a reactive gas 14 such as ammonia is injected into the flue gas stream, to promote the catalyzed reaction of the $NO_x$ compounds to nitrogen and water.

Figure 2:
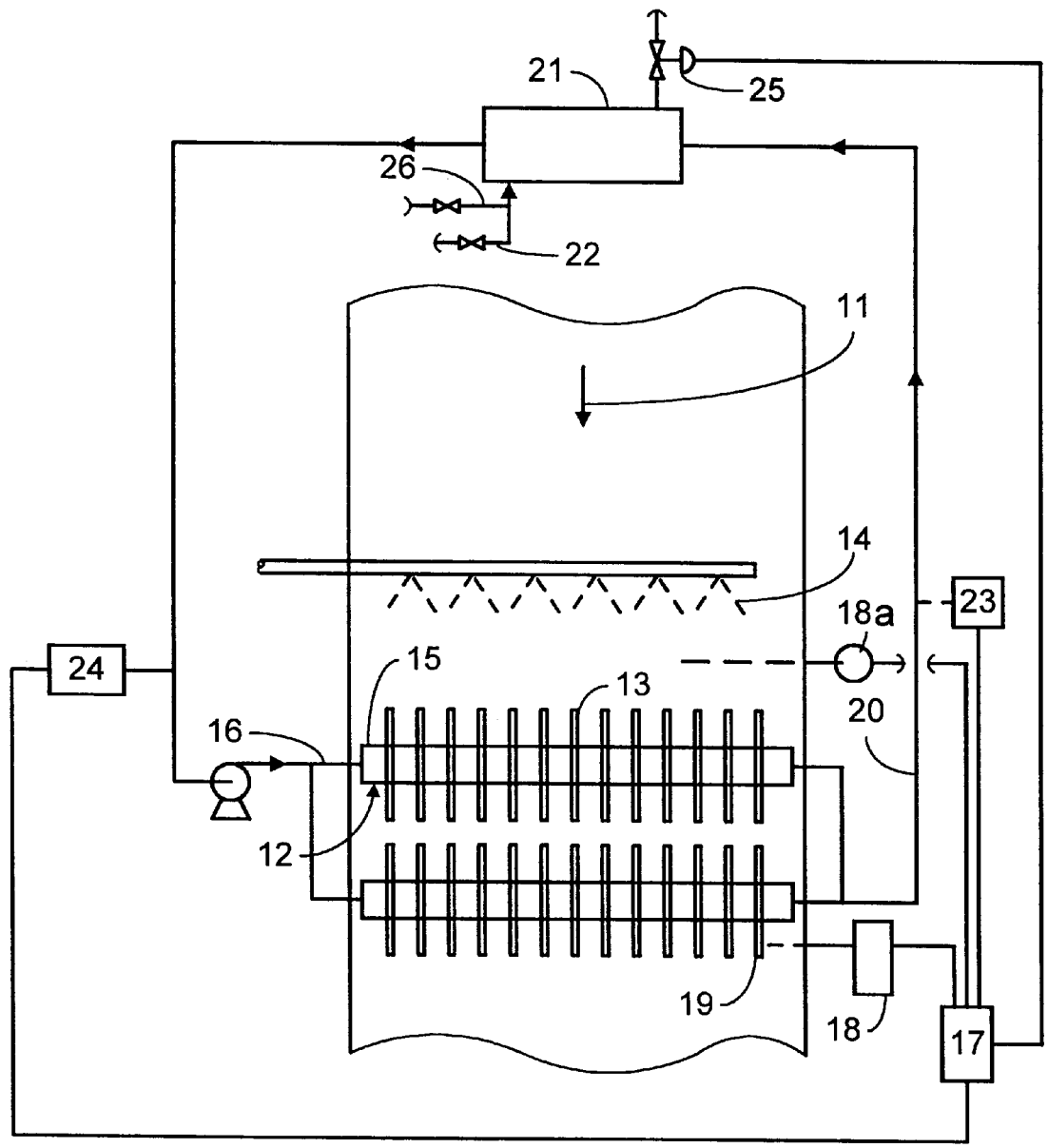
FIG. 2 is a view of a single element from a heat exchanger showing the distribution of catalysts on extended surfaces.

Referring to FIG. 2, each heat exchanger element is preferably a tube 15 through which a cooling medium 16 is circulated. This may be either a liquid or gas. A temperature controller 17 assures that the catalyst is maintained at a constant temperature during the reaction cycle.

The temperature controller 17 obtains a signal from a temperature sensor 18 associated with an extended surface or fin 19 which is coated with the catalyst. The controller also receives a signal from a temperature sensor 18a associated with the flue gas, the objective being to maintain the catalyst at the optimum temperature for conversion of the $NO_x$ compounds.

The controller is also integrated with a cooling system which adjusts the temperature of the cooling medium 16 to attain optimum control of the catalyst temperature. As shown in FIG. 2, the cooling medium passes through the elements 12 to cool the catalyst. In a closed cooling system, this medium exits the tubes at 20 and then is transported to a heat exchanger 21 where it is cooled by a coolant 22. Temperature sensors 23 and 24 signal the controller of the medium's temperature at 20 and after exiting the heat exchanger 21. The controller sends a signal to a valve 25 which adjusts the temperature of the cooling medium by controlling the flow of coolant 22.

It should be understood that this is but one of many alternative equivalent temperature control systems. For example, in many power plants, cooling water is readily available and this could simply be piped to the elements using existing feed and return piping, without using a dedicated pump and heat exchanger for this system. Of course, a temperature control valve would still be used to maintain the optimum cooling medium temperature.

In some instances, for example, during low power production periods or where the incoming air is particularly cool, it may be necessary to supply a heating medium, again to maintain the optimum temperature for conversion. Consequently, the system should have sufficient flexibility to circulate a heating medium, such as steam, to heat the catalyst in instances where the flue gas temperature is relatively low. As shown in FIG. 2, a heating medium 26 can be supplied to the heat exchanger 21.

Figure 3:
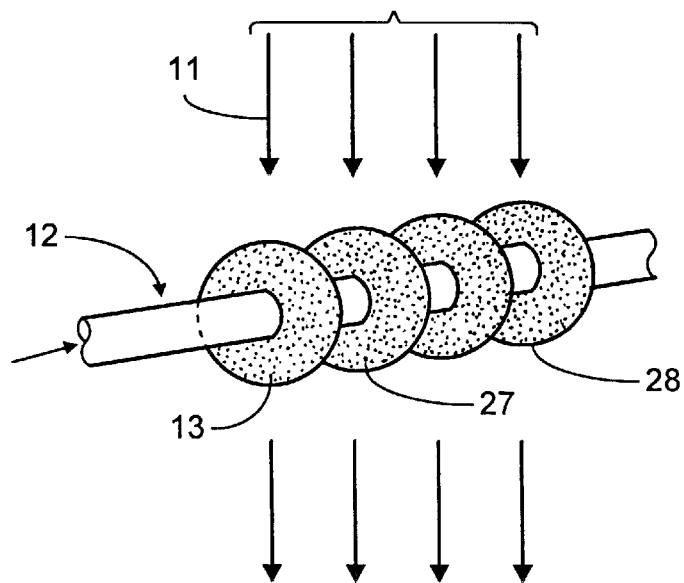
FIG. 3 is a schematic view of the temperature control system associated with the constant temperature catalyst exchanger.

Referring to FIG. 3, an enlarged cross-section of a single heating exchanger element 12 is shown. The heat exchanger element has a plurality of extended surfaces or fins 13. A catalyst 27 is placed on the fins in a thin layer, with the tube placed within the gas steam 11. The number of elements and their organization are such as to provide ease in installation and removal of one or more tubes for repair or replacement.

The cooling medium is of a temperature and has sufficient flow so as to maintain the extended surfaces at an optimum temperature for the catalyst. This temperature may be controlled by incorporating temperature sensing elements 28 on one or more of the fin tubes, with the flow of coolant increased or decreased in relation to the temperature sensed on the fin. As an alternative, the coolant outlet temperature can be sensed and controlled so as to provide assurance that the elements are maintained at the appropriate temperature, given an appropriate temperature differential for the transfer of heat through the fins. In addition, the flue gas temperature can be considered by the controller when optimizing the temperature of conversion.

Figure 4:
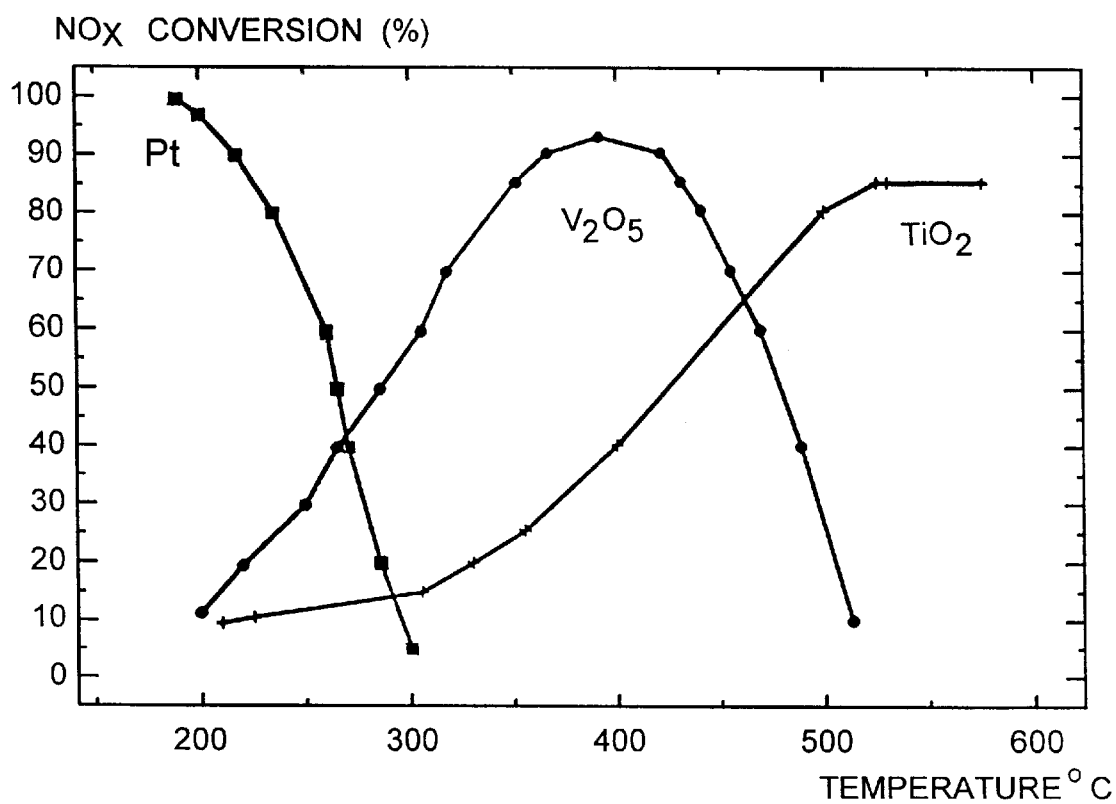
FIG. 4 is a graph showing the optimum temperatures for several SCR catalysts usable with the present invention.

The choice of SCR catalyst may depend on the anticipated temperature of the flue gas. For example, at lower temperatures, a platinum catalyst may be used, i.e., in the range of about 200° C. For temperatures in the range of from 300 to 450° C., a vanadium pentoxide catalyst may be used. Above 500° C., a titanium dioxide catalyst may be used. Each of these catalysts has a temperature range at which it is most effective, as shown in FIG. 4. Using the invention, it is possible to maintain the selected catalyst at its optimum temperature for maximum conversion.

Utilizing the present invention, this optimum temperature and thus the optimum conversation can be maintained while at the same time, temperature cycling is avoided as well as physical degradation of the catalyst which typically occurs when the catalyst is located on a regenerative heat exchanger. Of course, other SCR catalysts may be used in accordance with the present invention, both those presently existing and those developed in the future. Other catalysts which may be used include those based on vanadium, titanium, zeolites, copper, iron or cerium, and combination thereof. These may also be combined with other materials such as tungsten, iron, tin, molybdenum, zirconium, chrome or silica. Once a temperature profile is determined for the selected catalyst, it would be a relatively simple matter to adjust the temperature control system of the invention to maintain that optimum catalyst temperature in the flue gas steam.

By controlling the temperature of the catalyst, as opposed to the temperature of the flue gas, it is possible to reduce the size of the equipment necessary for maintaining the temperature, while at the same time avoiding a reduction in the flue gas temperature which could result in a corresponding reduction in conversion efficiency. Dedicated heat exchanger elements, as opposed to a fixed bed, can be quickly removed and replaced with substitute elements, without a prolonged shutdown. Such elements also do not cause pressure drop variations as does a static catalyst bed subject to fouling. Utilizing the present invention, maximum reductions in $NO_x$ compounds are achieved, at relatively low capital costs.

While preferred embodiments of the present invention have been shown and described, it will be understood by those skilled in art that various changes or modifications could be made without varying from the scope of the present invention.

What is claimed is:

1. A catalytic method for reducing NOX in a flue gas stream comprising:

providing a flue gas stream containing NOX;

placing at least one heat exchange element having extended surfaces in the flue gas stream, the heat exchange element having a SCR catalytic on at least the extended surfaces thereof,;

passing a temperature altering medium through the heat exchange element; and, providing a temperature control system to control the temperature of the temperature altering medium such that the SCR catalyst is maintained at its optimum temperature to achieve about 80% conversion of NOX.

2. The method of claim 1 further comprising:

providing a heat exchange element having a SCR catalyst select from the group consisting of platinum, vanadium pentoxide, titanium dioxide, zeolites, copper, iron or cerium and combination thereof.

3. The method of claim 1 further comprising:

injecting a reactive material into the flue gas stream to promote conversion of the $NO_x$ to nitrogen and water.

4. The method of claim 1 further comprising:

placing a second heat exchanger in the flue gas stream, before or after the heat exchange element, to cool the flue gas stream.

5. The method of claim 1 further comprising:

providing a boiler, mixing a fuel with air in the boiler and burning the fuel and air to produce the flue gas stream; and providing tubes within the boiler to produce stream.

6. The method of claim 1 further comprising:

providing a first temperature sensor associated with the flue gas stream, a second temperature sensor associated with the heat exchange and a third temperature sensor associated with the temperature altering medium; and, providing the controller to accept signals from the temperature sensors and to output a control signal for controlling the flow of cooling medium through the heat exchange element.

7. A catalytic method for reducing NOX in a flue gas stream comprising:

providing a flue gas stream, placing at least one heat exchange element having a SCR catalytic on at least the extended surfaces thereof;

passing a temperature altering medium through the heat exchange element;

providing a temperature control system to control the temperature of the temperature altering medium such that the SCR catalytic is maintained at its optimum temperature;

providing a first temperature sensor associated with the flue gas stream, a second temperature sensor associated with the heat exchanger and a third temperature sensor associated with the temperature altering medium; and, providing a controller to accept signals from the temperature sensors and to output a control signal for controlling the flow of the temperature altering medium through the heat exchange element.

* * * * *